United States Patent [19]
Lin

[11] Patent Number: 5,406,745
[45] Date of Patent: Apr. 18, 1995

[54] HONEYCOMB GRASSPLANTING UNIT

[76] Inventor: Chin T. Lin, No. 15-3, Pei Ping Yi St., Taichung, Taiwan, Prov. of China

[21] Appl. No.: 75,165

[22] Filed: Jun. 10, 1993

[51] Int. Cl.[6] ............................................. A01G 9/02
[52] U.S. Cl. ......................................... 47/1.01; 47/33; 404/41
[58] Field of Search ...................... 47/1 F, 33; 404/36, 404/41, 42; 52/181, 581, 660

[56] References Cited

U.S. PATENT DOCUMENTS

| 3,168 | 7/1893 | Terry | 52/581 |
|---|---|---|---|
| 16,757 | 3/1857 | Shepard | 404/41 |
| 440,141 | 11/1890 | Dearborn | 47/33 |
| 986,395 | 3/1911 | King | 47/33 |
| 1,722,139 | 7/1929 | Galassi | 52/181 |
| 3,137,095 | 6/1964 | Pearson | 47/33 |
| 4,067,197 | 1/1978 | Ritter | 405/258 |
| 4,111,585 | 9/1978 | Mascaro | 47/1 F |
| 4,454,698 | 6/1984 | Manzelli | 52/581 |
| 4,478,901 | 10/1984 | Dickens et al. | 404/36 |
| 4,621,942 | 11/1986 | Hill | |

FOREIGN PATENT DOCUMENTS

| 2704722 | 8/1977 | Germany | 47/1 F |
|---|---|---|---|
| 4143228A1 | 7/1993 | Germany | |
| 1709040A | 1/1992 | U.S.S.R. | 52/660 |

Primary Examiner—Ramon S. Britts
Assistant Examiner—Joanne C. Downs
Attorney, Agent, or Firm—McCubbrey, Bartels & Ward

[57] ABSTRACT

A honeycomb grass planting unit includes a hexagonal body with six peripheral walls extending vertically and including a plurality of soilpots and a central fence therein. The soilpots are interconnected by plates to reinforce the structure. Holes are formed in the soilpots and the fence through which hoses pass. Two receiving sockets are disposed on diagonal apexes of the hexagonal body and are releasably engaged with four snapping fasteners disposed on the remaining apexes of another hexagonal body to provide a releasable interconnection between two honeycomb grassplanting units.

9 Claims, 3 Drawing Sheets

HONEYCOMB GRASSPLANTING UNIT

BACKGROUND OF THE INVENTION

The present invention relates to a unit with soilpots to plant grass therein.

A typical grassplanting unit is a rectangular plate consisting of interconnected circles in which grass is planted. These units are connected by pegs and socket fasteners provided thereon. Such connection is, however, very weak, and is easily damaged by a vehicle, wheels of which exert a considerable tangential force on the pegs and the socket fasteners.

The present invention provides a stronger connecting structure and larger space to plant grass and to mitigate and/or obviate the afore-described disadvantages of the conventional grassplanting unit.

SUMMARY OF THE INVENTION

In accordance with one aspect of the present invention, there is provided a honeycomb grassplanting unit comprising a plurality of soilpots, two receiving sockets disposed on two apexes of said unit and four snapping fasteners disposed in recesses of remaining apexes. The snapping fasteners of units releasably engage with the receiving sockets of other units to form a larger plane, and grass can be planted in the soilpots.

Preferably, the soilpots are connected by plates to reinforce the structure thereof.

As the unit is hexagonal, one of the snapping fasteners and the receiving sockets can distribute external force which is exerted by vehicles' wheels to other snapping fasteners and receiving sockets.

The advantages of the present invention will be apparent from a careful reading of the detailed description provided hereinbelow, with appropriate reference to the accompanying drawings.

DETAIL DESCRIPTION OF THE PREFERRED EMBODIMENT

Figure 1:
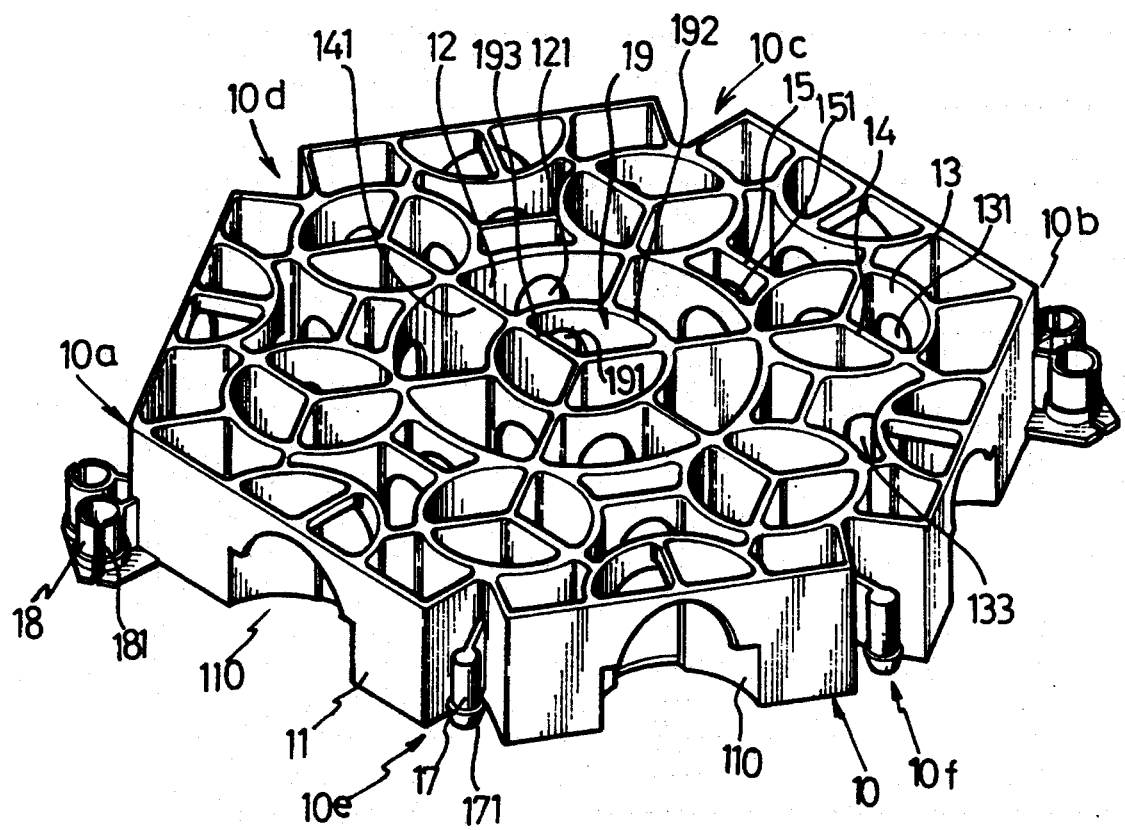
FIG. 1 is a perspective view of a honeycomb grassplanting unit in accordance with the present invention.
Figure 2:
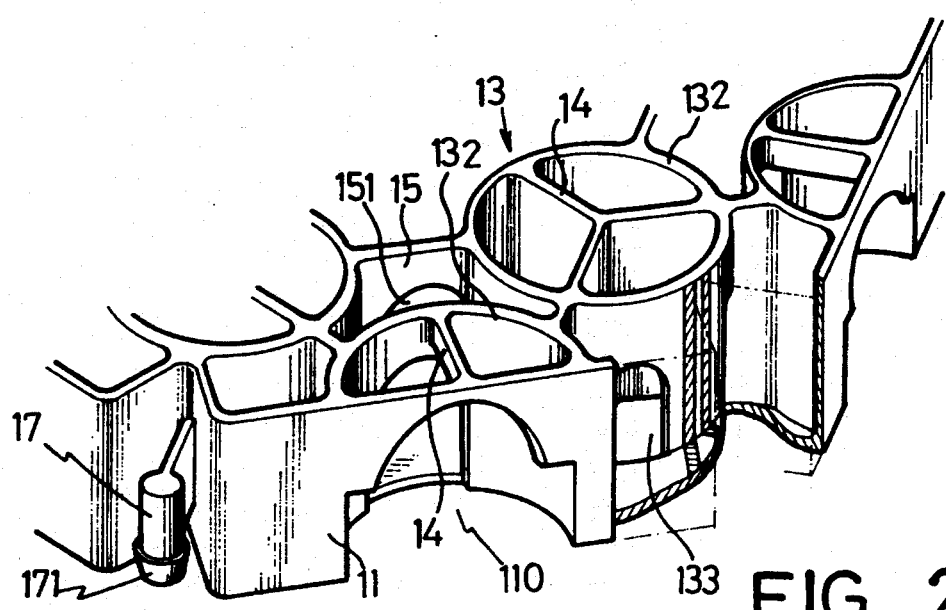
FIG. 2 is a perspective view, partly sectional, illustrating the side holes in the soilpots.
Figure 3:
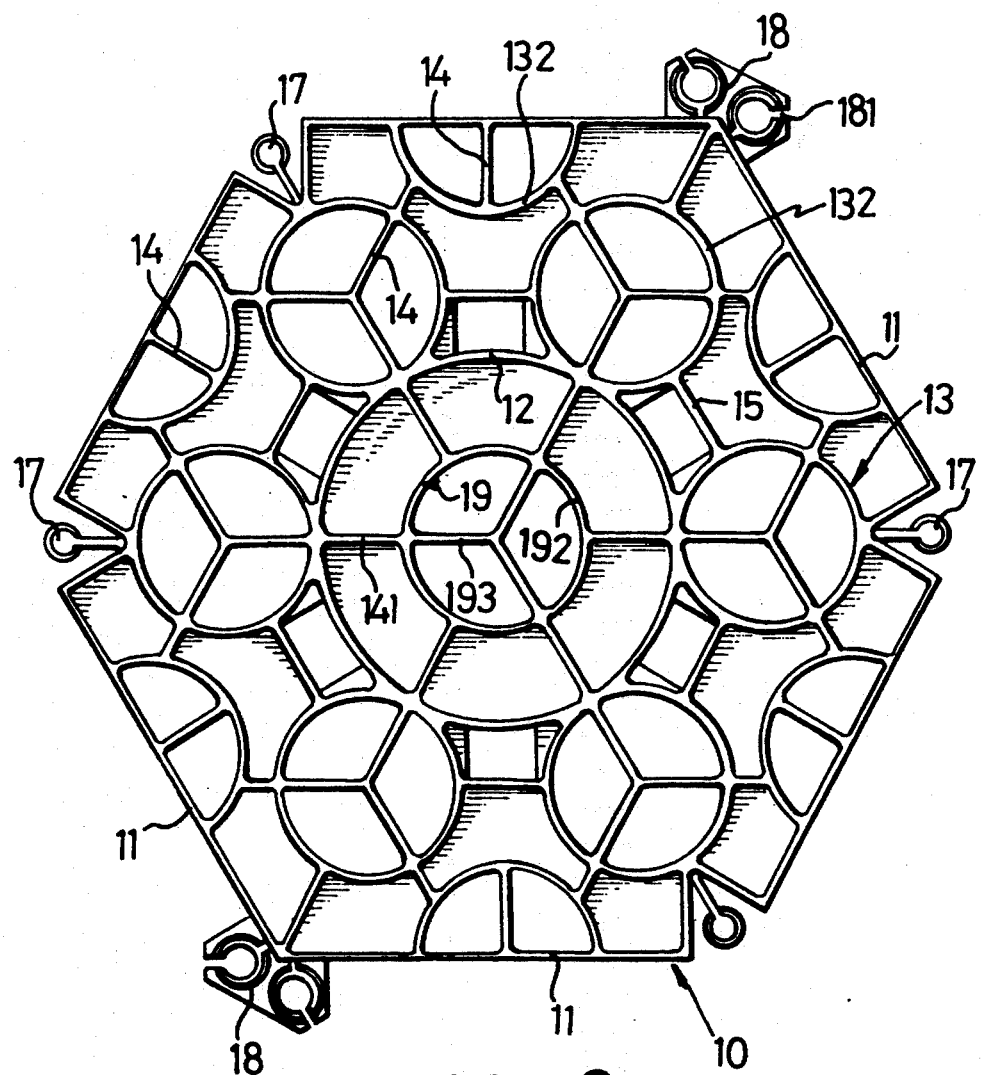
FIG. 3 is a top plane view of a honeycomb grassplanting unit in accordance with the present invention.

Referring to the drawings, and initially to FIGS. 1 to 3, a honeycomb grassplanting unit in accordance with the present invention is a substantially hexagonal body 10 with six apexes 10a, 10b, 10c, 10d, 10e, and 10f having six peripheral walls 11 extending vertically in which a plurality of soilpots 13 are provided. Each soilpot 13 is formed by an annular wall 132 extending vertically and is connected to adjacent soilpots 13 by plates 15 integrally formed therebetween. A fence 12 is disposed in and surrounds the center of the hexagonal body 10. The soilpot 13 includes at least one reinforcement rib 14 therein to form several separated compartments. A central soilpot 19 comprising at least one reinforcement rib 193 is disposed in the center of the fence 12 and is connected to the fence 12 by at least one connecting rib 141.

Figure 4:
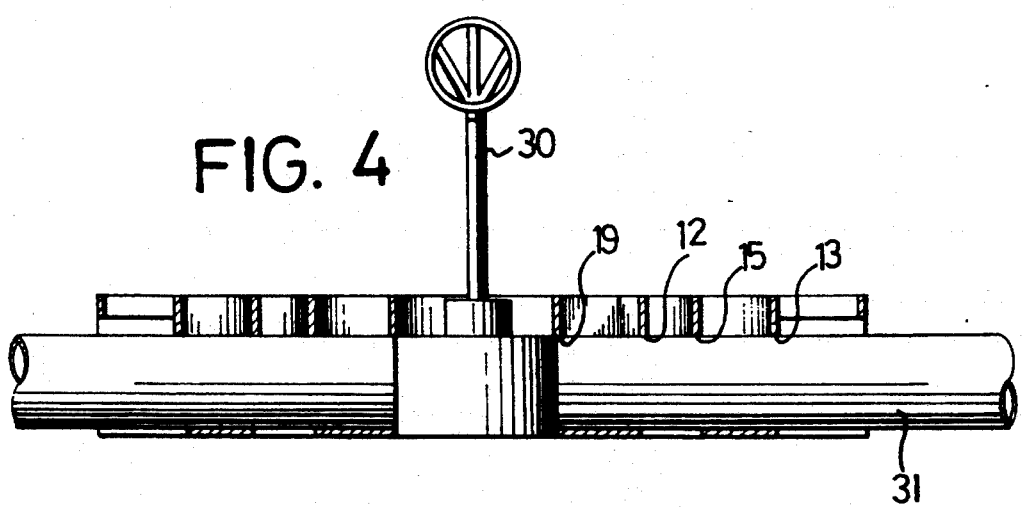
FIG. 4 is a view illustrating the installation of a hose and a sprinkler in the honeycomb grassplanting unit.

As shown in FIGS. 1 and 4, the walls 132 of the soilpots 13, the plate 15, the fence 12 and the wall 192 of the central soilpot 19 respectively have holes 131, 151, 121, and 191. An opening 110 formed in each wall 11 of the hexagonal body 10 aligns with the holes 131, 151, 121, and 191 which allow a hose 31 to pass through which is engaged with a sprinkler 30.

As shown in FIGS. 1 and 2, the walls 132 respectively have side holes 131 therein which do not align with the opening 110, however, provide enough space for roots of grass.

Figure 6:
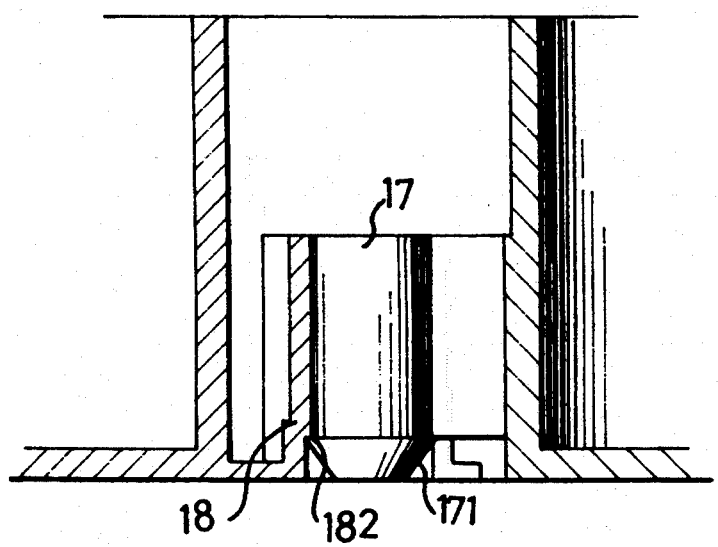
FIG. 6 is a cross sectional view showing the engagement of the snapping fastener connecting to the receiving socket of a honeycomb grassplanting unit in accordance with the present invention.
Figure 5:
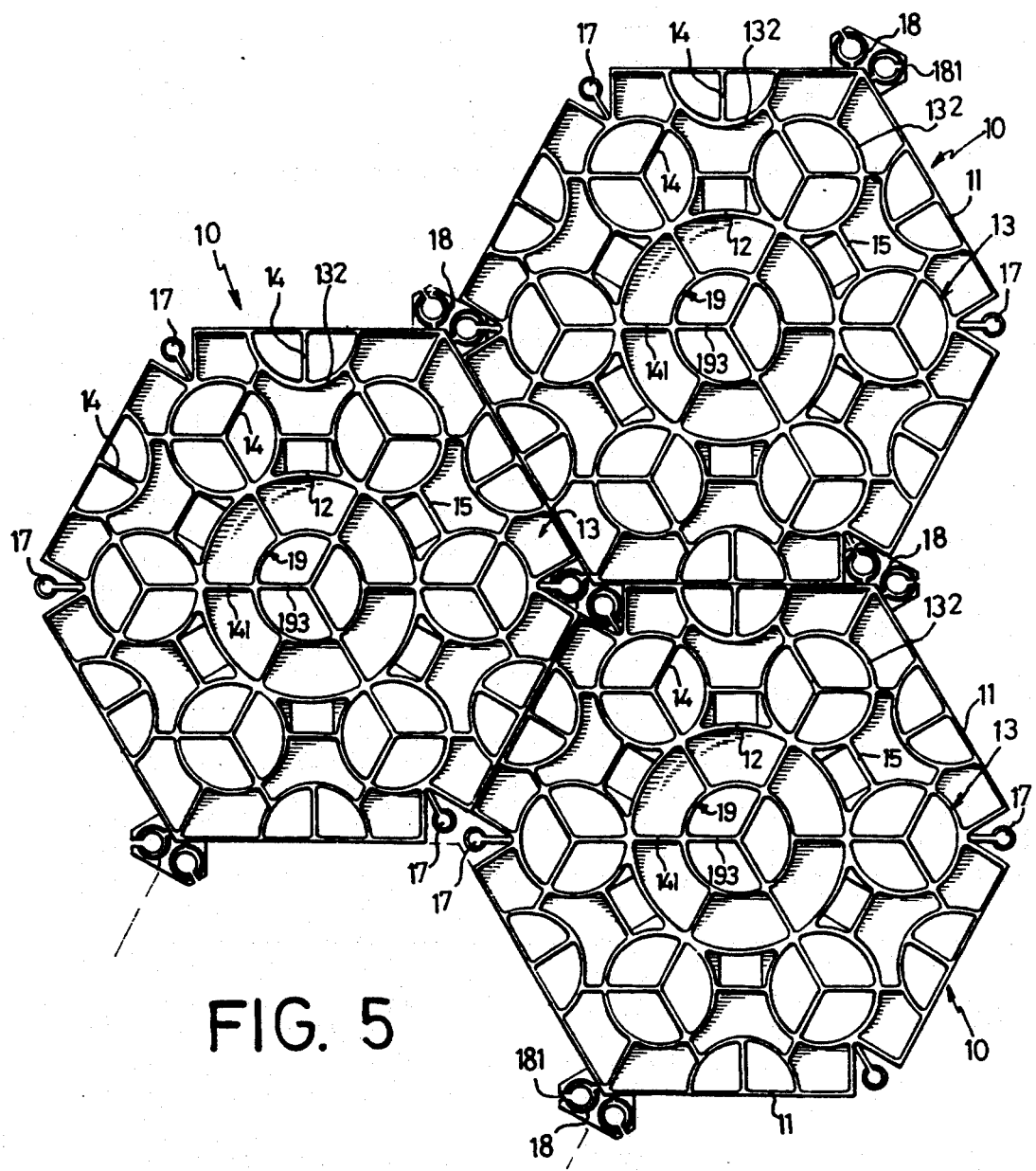
FIG. 5 is a top plane view of interconnection of a honeycomb grassplanting unit in accordance with the present invention.

Referring to FIGS. 1, 5, and 6, two receiving sockets 18 are disposed on diagonal apexes 10a, 10b of the hexagonal body 10 each comprising a slit 181 on its longitudinal direction and a recess 182 at a lower end thereof. The remaining apexes 10c, 10d, 10e, and 10f are recessed to form a space in which a snapping fastener 17 is provided. The snapping fastener 17 has a snapping head 171 at a lower end thereof which is releasably engaged with the receiving socket 18. The slit 181 allows the insertion of the snapping head 171 which is releasably received in the recess 182. By such an arrangement, the honeycomb grassplanting unit can be releasably interconnected with another unit to provide a grass planting area and further provide a stronger structure to bear vehicle wheels rolling thereon.

Although this invention has been described with a certain degree of particularity, it is to be understood that the present disclosure has been made by way of example only and that numerous changes in the detailed construction and arrangement may be resorted to without departing from the spirit and scope of the invention as hereinafter claimed.

I claim:

1. A honeycomb grassplanting unit comprising:
   a hexagonal body (10) with six peripheral walls(11) extending vertically therefrom;
   a fence (12) disposed in and surrounding a center of said hexagonal body (10);
   a plurality of soilpots (13) disposed between said walls (11) and said fence (12) and having walls (132) extending vertically therefrom;
   a plurality of plates (15) extending between said walls (132) of two adjacent said soilpots (13) to provide a connection therebetween;
   a central soilpot (19) disposed in said hexagonal body (10) surrounded by said fence (12); and
   a plurality of reinforcement ribs (14) being provided in said soilpots (13, 19).

2. The honeycomb grassplanting unit according to claim 1 wherein a plurality of connecting ribs (141) are provided to connect said fence (12) and said central soilpot (19).

3. The honeycomb grassplanting unit according to claim 1 further comprising a connecting means to connect another hexagonal body (10).

4. The honeycomb grassplanting unit according to claim 3 wherein said connecting means comprises two receiving sockets (18) respectively disposed on two diagonal apexes (10a, 10b) of said hexagonal body (10), and four snapping fasteners (17) respectively disposed on the remaining apexes (10c, 10d, 10e, and 10f) for releasably engaging with said sockets (18) of said another hexagonal body (10).

5. The honey comb grassplanting unit according to claim 4 wherein said hexagonal body (10) is indented inward in the remaining apexes (10c, 10d, 10e, 10f) and each said indented apex (10c, 10d, 10e, 10f) has one snapping fastener (17) disposed thereto.

6. The honeycomb grassplanting unit according to claim 4 wherein a slit (181) is defined in said receiving socket (18) and a recess (182) is defined in one end of said socket (18); and said snapping fastener (17) having a snapping head (171) formed on one end thereof and said snapping head (171) being releasably engaged with said recess (182) of said socket (18).

7. The honeycomb grassplanting unit according to claim 1 wherein said peripheral wall (11) has an opening (110) defined therein, said plate (15) and said fence (12) respectively have a hole (151, 121) defined therein and each of which aligns with said opening (110).

8. The honeycomb grassplanting unit according to claim 7 wherein said central soilpot (19) has a hole (191) defined in said wall (192) and said hole (191) is aligned with said opening (110).

9. The honeycomb grassplanting unit according to claim 1 wherein each said soilpot (13) has at least one side hole (133) defined in said wall (132) thereof.

* * * * *